United States Patent [19]

Pingaud et al.

[11] 4,451,535

[45] May 29, 1984

[54] MAGNETIC RECORDING ELEMENTS, PROCESS FOR MAKING THE SAME AND THEIR USE IN RECORDING

[75] Inventors: Bernard J. Pingaud, Vincennes; Claude Poncet, Noisy-le-Grand, both of France

[73] Assignee: Eastman Kodak Company, Rochester, N.Y.

[21] Appl. No.: 253,483

[22] Filed: Apr. 13, 1981

[30] Foreign Application Priority Data

Jul. 16, 1980 [FR] France .............................. 80 401064

[51] Int. Cl.$^3$ .............................................. G11B 5/70
[52] U.S. Cl. .................................. 428/329; 360/134; 360/135; 360/136; 252/62.54; 427/128; 428/328; 428/694; 428/695; 428/900
[58] Field of Search ............... 428/692, 694, 695, 900, 428/328, 329; 360/134, 135, 136; 427/128; 252/62.54

[56] References Cited

U.S. PATENT DOCUMENTS

| | | | |
|---|---|---|---|
| 3,080,319 | 3/1963 | Arrington, Jr. | 252/62.5 |
| 3,627,580 | 12/1971 | Krall | 427/48 |
| 4,163,823 | 8/1979 | Legras et al. | 428/304 |
| 4,208,447 | 6/1980 | Bate et al. | 427/128 |
| 4,260,466 | 4/1981 | Shirahata et al. | 204/192 M |
| 4,273,807 | 6/1981 | Berry | 427/128 |
| 4,287,233 | 9/1981 | Rudolf et al. | 427/128 |
| 4,338,643 | 7/1982 | Tadakoro | 360/135 |

FOREIGN PATENT DOCUMENTS 717269 10/1954 United Kingdom .

OTHER PUBLICATIONS

"The Physics of Magnetic Recording", C. D. Mee, 1964, John Wiley and Sons, Inc., New York, pp. 141, 167–168 and 192.

Research Disclosure, vol. 187, Nov. 1979, Item 1872, pp. 665–666, published by Industrial Opportunities Ltd., Homewell, Havant Hampshire PO9 1EF, United Kingdom.

Iwasaki et al. "Perpendicular Magnetic Recording With a Composite Anisotropic Film", IEEE Transactions on Magnetics, vol. MAG-15, No. 6, pp. 1456–1458, Nov. 1979.

J. U. Lemke, "Ultra High Density Recording with New Heads and Tapes", IEEE Transactions on Magnetics, vol. MAG-15, No. 6, Nov. 1979.

Primary Examiner—Ellis P. Robinson
Attorney, Agent, or Firm—Bernard D. Wiese

[57] ABSTRACT

Magnetic recording elements having at least one magnetic recording layer containing acicular magnetic particles that have magnetocrystalline anisotropy, shape anisotropy which provides a preferred axis of magnetization and a coercivities of at least 450 Oersteds. These particles are dispersed in a binder and form a distribution that imparts an isotropic magnetic response to the magnetic recording layer.

A Process for preparing the above magnetic recording elements is also disclosed. According to this process, the aforementioned magnetic particles are dispersed in a liquid medium. The dispersion is formed into a magnetic recording layer while establishing a distribution of particles that has spherically symmetrical magnetic properties (symmetry that is three-dimensional). The layer is then solidified while maintaining this distribution.

A magnetic recording method is also disclosed. This method involves (1) providing a signal modulated magnetic field by means of a gapped magnetic ring head, (2) subjecting to that field a magnetic recording layer of the type previously described and (3) causing relative motion between the head and the layer.

14 Claims, 4 Drawing Figures

MAGNETIC RECORDING ELEMENTS, PROCESS FOR MAKING THE SAME AND THEIR USE IN RECORDING

BACKGROUND OF THE INVENTION

This invention relates to magnetic recording. In one aspect, this invention relates to magnetic recording elements, particularly high performance magnetic tapes, bearing recording layers that are substantially isotropic magnetically, i.e., magnetic recording layers that are capable of supporting substantially equal magnetic response in the directions of their length, width and thickness. In another aspect, this invention relates to magnetic recording tape which is capable of increased signal output at short recorded wavelengths. In still another aspect, this invention relates to a process for the preparation of high performance magnetic recording elements and their use.

DESCRIPTION OF THE PRIOR ART

A conventional magnetic recording element usually comprises a support, such as plastic film, a metal or glass substrate bearing thereon at least one magnetic recording layer containing magnetic particles such as gamma ferric oxide particles dispersed in a suitable binder which is commonly a nonmagnetizable polymeric material. In early magnetic recording elements (30-40 years ago), the magnetic particles employed were nonelongated, e.g., gamma ferric oxide particles having a cubic shape. Like the magnetic recording layers of this invention, magnetic recording layers containing such particles were substantially isotropic magnetically. However, the undoped cubic-shaped gamma ferric oxide partricles employed in such elements typically exhibited coercivities not much over 150 Oersteds and magnetic recording elements employing them are not capable of meeting present day needs for high performance magnetic recording.

The coercivities of the magnetic particles previously described, such as cubic-shaped gamma ferric oxide, could be increased by doping with ions such as cobalt. An early example of such doping is shown in British Pat. No. 717,269, complete specification published Oct. 27, 1954. Unfortunately, the higher coercivities were obtained at the expense of thermal stability with the result that magnetic recording layers containing such doped particles exhibited serious fading of recorded signal, even at ambient temperature. In fact, magnetic tapes of the late 1940's and early 1950's were observed to suffer a loss in recorded signal output of 5 dB or more merely upon 30 minutes keeping at room temperature. C. D. Mee made reference to this situation in his definitive text, "The Physics of Magnetic Recording," 1964, John Wiley and Sons, Inc., New York, N.Y. at page 168 wherein he stated:

"... commercial application of powders with nonuniaxial (cubic) anisotropy has also been successfully accomplished. This has been achieved by minimizing shape anisotropy through the use of spherical or cubical shapes in particles having high cubic crystal anisotropy. As will be shown, such powders have unique advantages for tapes: their magnetic properties are inherently size independent and very small particles with uniform properties are obtainable. Specific disadvantages, such as temperature dependence of magnetic properties, have, however, limited their application."

As a result of the aforementioned problems, magnetic recording elements that used cubic-shaped particles fell into disuse with the advent of acicular magnetic particles (needle-like particles). Such acicular particles offered several advantages including hgher coercivity which resulted from the contribution of shape anisotropy, no significant signal fading in magnetic recording layers containing such particles and the ability to be magnetically oriented within a magnetic recording layer of an element such as a magnetic tape.

Orientation is generally considered to improve magnetic properties such as signal output, information storage capacity and intensity of remanent magnetization. Orientation is conveniently achieved commercially by exposing a magnetic recording tape, at a stage in its preparation when the coating composition is sufficiently fluid to allow movement of the magnetizable particles, to a magnetic field which orients such particles so that their easy directions of magnetization tend to be parallel to each other and to the general direction of tape movement during use. Such orientation results in a magnetic recording layer that exhibits magnetic anisotropy, i.e., magnetic characteristics that are different in different directions. The presence of such magnetic anisotropy can be detected in a magnetic recording layer since it manifests itself as a variation in both coercivity and intensity of remanent magnetization as a function of the angle along which these properties are measured.

Illustrative prior art teachings of maximizing anisotropy in a magnetic recording layer to improve magnetic properties such as signal output, remanent magnetization and information storage capacity can be found in the patent literature in Legras et al. U.S. Pat. No. 4,163,823, issued Aug. 7, 1979, and Arrington U.S. Pat. No. 3,080,319, issued Mar. 5, 1963. C. D. Mee also addressed this point, "The Physics of Magnetic Recording," ibid., at page 141 wherein he stated:

"For the magnetic material in the tape it is desirable to achieve a maximum remanent intensity of magnetization in the direction of the recording field. In addition, since the field changes direction in the recording zone at the trailing edge of the recording head, it is also advantageous if the magnetization change is small due to fields in directions other than the preferred direction. The preferred direction is usually along the direction of relative motion between the tape and the head, for conventional 'longitudinal' recording, even though the recording field direction rotates towards a perpendicular direction near the recording head. Very thin coatings for short wavelength recording may give larger remanent magnetizations if their preferred direction is tilted towards that of the recording field."

In "longitudinal" recording of the type referred to by C. D. Mee, it is conventional to use a gapped ring magnetic head for recording and/or reproducing information signals in a magnetic recording layer. In those instances where such a magnetic recording head has a relatively long gap, the use of a magnetically anisotropic recording layer permits effective recording of longer wavelength signals. However, as shorter and shorter wavelength signals are recorded, the use of such a layer becomes progressively less effective. Inasmuch as there is an increasing need for recording higher frequency signals at reasonable tape velocities (and recording shorter wavelength signals), the use of an anisotropic recording layer is becoming less appropriate for obtaining maximum recording efficiency. Furthermore, it is known that a short recording gap is more effective than a long gap for recording short wavelength signals. We have found that an isotropic magnetic recording layer as described herein, rather than an anisotropic magnetic recording layer, cooperates more effectively with a short recording gap and permits more efficient recording of such short wavelength signals.

Another example from the prior art which illustrates that anisotropic magnetic recording layers are considered to be the most appropriate media for effective recording is found in a recent article by S. Iwasaki et al entitled, "Perpendicular Magnetic Recording With A Composite Anisotropic Film," IEEE Transactions on Magnetics, MAG-15, pages 1456–1458, November, 1979. This article relates to "vertical" recording (sometimes referred to as "perpendicular" recording) which is an alternative to conventional "longitudinal" recording. In "vertical" recording, a single pole of the recording head is placed perpendicular to the magnetic recording layer and in contact with it such that the direction of magnetizing flux from the head lies perpendicular to the plane defined by the surface of the magnetic recording layer. The magnetic recording layer employed by Iwasaki et al. is specifically designed to support magnetization in such perpendicular direction and to be magnetically unresponsive to magnetization in a direction parallel to the aforementioned plane. It is an anisotropic magnetic recording layer. The "vertical" recording method and element are described in the above article as follows:

"It was pointed out that an extremely high density recording can be realized by a new perpendicular magnetic recording system. A perpendicular head proposed by the authors, has the main pole of magnetic thin film which contacts perpendicularly with the recording medium to record signal. The recording medium is a Co-Cr perpendicular anisotropy film prepared by an r.f. sputtering."

"It is expected that, from a theoretical analysis of the demagnetization mechanism, the perpendicular recording has the magnetization mode essentially suitable for high density digital recording. However, a large amplitude of record current (or magneto-motive force) is needed as compared with a conventional ring head, since the perpendicular head has an open structure in its magnetic circuit."

It is significant to note that, in contrast to Iwasaki et al., this invention provides a magnetic recording element that is capable of providing excellent reproduced signal output at short wavelengths when it is used to make a recording with a conventional ring head.

As contrasted to "longitudinal" or "vertical" recording, prior art magnetic recording elements used in quadruplex, helical scan, and disc recordings are conventionally designed to support magnetization in at least two directions in the plane defined by the surface of the magnetic recording layer. Magnetization in directions out of such plane, e.g., in a direction perpendicular to such plane, is deliberately suppressed, which results in a layer that is magnetically anisotropic. Also, in order to obtain an acceptable balance of remanent magnetizations in each of the desired directions, a compromise is made such that signal recordability in each of these directions becomes less than desired. It would be desirable to have available an element having an isotropic magnetic recording layer which would support remanent magnetization in two or more directions without making such a compromise. The present invention has this as one of its objectives.

SUMMARY OF THE INVENTION

In accordance with this invention, we provide a magnetic recording element comprising an isotropic magnetic recording layer that exhibits improved magnetic properties such as information storage capacity, intensity of remanent magnetization, and increased signal output at short wavelengths, in comparison to both the isotropic and anisotropic prior art elements discussed hereinbefore. Furthermore, we have achieved our results by proceeding in a manner which is contrary to general and specific teachings of relevant prior art. Thus, as indicated in the "Description of the Prior Art," such teachings clearly direct one to design a magnetic recording layer that is magnetically anisotropic in order to improve its magnetic recording efficiency. Furthermore, we provide high coercivity magnetic recording elements of enhanced thermal stability in comparison with isotropic prior art elements.

This invention provides a magnetic recording element including at least one layer containing acicular magnetic particles that have coercivities of at least 450 Oersteds and are dispersed in a suitable binder. Such magnetic particles have both magnetocrystalline anisotropy and shape anisotropy, as will be discussed in greater detail herein. Also, they are in the form of a distribution that has spherically symmetrical intrinsic magnetic properties. Such symmetry is three-dimensional about a point as opposed to one-dimensional or two-dimensional symmetry which can exist solely within the plane of a recording layer. Accordingly, a specific intrinsic magnetic property (such as coercivity, intensity of remanent magnetization or magnetic permeability) will have a value which is substantially the same when measured in any direction from a point in the distribution. Such a distribution is unique and imparts to the magnetic recording layer magnetic isotropy as to coercivity and intensity of remanent magnetization. As a result, the magnetic recording layer exhibits coercivities that are substantially the same in three orthogonal (mutually perpendicular) directions, i.e., coercivities within ±5 percent. Likewise, the magnetic recording layer is capable of supporting intensities of remanent magnetization that are substantially the same in three orthogonal (mutually perpendicular) directions, i.e., intensities of remanent magnetization within ±5 percent. These relationships among coercivities and intensities of remanent magnetization are characteristic of the isotropic magnetic recording layer of this invention, and provide a convenient test for determining the presence of the distribution.

This invention also provides a method for making a magnetic recording element that is capable of increased signal output at short recorded wavelengths. In practicing this process, the aforementioned acicular magnetic particles are dispersed in a liquid medium. The dispersion is then formed into a layer while establishing a distribution of particles that has spherically symmetrical magnetic properties. The layer is then solidified while maintaining the distribution. The resulting magnetically isotropic layer has coercivities that are substantially the same in three orthogonal directions. It is also capable of supporting intensities of remanent magnetization that are substantially the same in three orthogonal directions.

This invention also provides a magnetic recording method that produces a recording which is capable of increased signal output at short recorded wavelengths. This method involves providing a signal modulated magnetic field by means of a gapped magnetic ring head, subjecting to that field an isotropic magnetic recording layer as described herein, and causing relative motion between the head and the layer.

DESCRIPTION OF SPECIFIC EMBODIMENTS

Figure 1A:
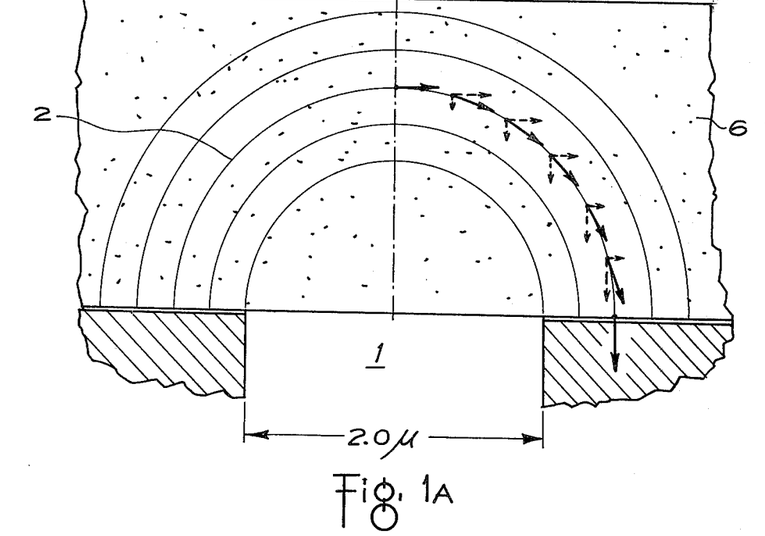
FIGS. 1A and 1B are schematic illustrations of the gap regions of a relatively long gap recording head (gap length 2 microns) and a relatively short gap recording head (gap length 0.4 micron) respectively. Associated magnetizing flux lines and some of their magnetic flux vectors resolved into longitudinal and vertical components are depicted. Magnetic recording layers are shown bridging the respective recording gaps.

To add to an understanding of this invention, it is considered appropriate now to discuss certain aspects of magnetic recording using gapped record heads. Reference is made to FIG. 1A, depicting record gap 1 having a gap length of 2 microns and magnetic flux vectors (designated by solid arrows) located tangent to a semicircular magnetizing flux line 2 of constant flux magnitude. The magnetic flux vectors are resolved into longitudinal and vertical components that are shown by dashed arrows. Magnetic recording layer 6 bridges the recording gap and the direction of motion of the recording layer is shown by arrow 9. As illustrated in FIG. 1A, it can be seen that the longitudinal components provide their most significant contribution in the region of deeper penetration into the magnetic recording layer 6 located in line with the head gap, while the vertical components provide their most significant contribution in the region of lesser penetration just after the magnetic recording layer has left the gap and "downstream" of it. Accordingly, a magnetic recording layer that is responsive to all components of the magnetic flux vector (vertical as well as longitudinal, for example), can respond most efficiently to the recording flux, provided appropriate recording and reproducing conditions are selected so that responses from vertical and longitudinal fluxes reinforce one another and can be easily combined in phase. The isotropic magnetic recording layers of this invention make such a response possible.

Figure 1B:
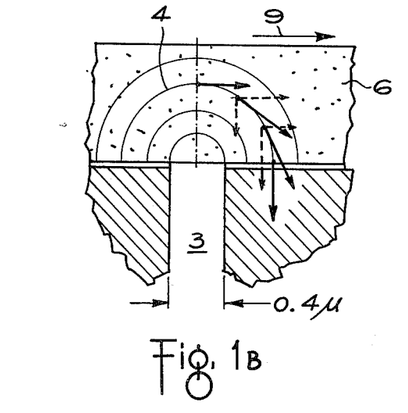

Referring now to FIG. 1B, there is depicted a record gap 3 having a gap length of 0.4 micron, together with its associated semi-circular magnetizing flux line 4, magnetic flux vectors (solid arrows) and longitudinal and vertical components (dashed arrows) of such vectors.

By comparing FIGS. 1A and 1B, it can be seen that as the gap length decreases, the area in the recording layer dominated by vertical components of the recording flux gets closer to the area dominated by horizontal components. In this situation, it is even more important for the magnetic recording layer to efficiently respond to each of these components, since they are now more easily reproduced in additive phase. Obviously, with such shorter gap lengths, an isotropic magnetic recording layer of this invention is capable of recording substantially all available flux vectors while a prior art anisotropic recording layer will reject a significant portion of such flux vectors. In FIGS. 1A and 1B, only one of the several magnetizing flux lines depicted (2 and 4 in FIGS. 1A and 1B, respectively) has its magnetic flux vectors and components illustrated for purposes of the preceeding discussion. However, it should be apparent that the other magnetizing flux lines depicted in the drawings could be similarly illustrated. It will also be apparent to those skilled in the art that the last flux line of sufficient intensity to provide a state change in any portion of the magnetic recording layer will leave its "state" impressed along that line.

To obtain a distribution of magnetic particles having spherically symmetrical intrinsic magnetic properties according to this invention, it is necessary to consider the nature of the individual particles that form such distribution. It is known that in the absence of an applied magnetic field, the preferred directions of magnetization within a particle are controlled by its magnetic anisotropy. Although magnetic anisotropy can result from several different factors, it is generally agreed that the dominant anisotropy factors affecting the directional dependence of magnetization in the particles of concern in this invention are shape anisotropy and magnetocrystalline anisotropy. Shape anisotropy arises from elongation along one or two axes of the particles since a magnetization state that has the largest pole separation is most easily maintained. Magnetocrystalline anisotropy arises because of the existence of preferred stable magnetizations ("easy" axes of magnetization) with respect to crystal axes within individual particles. For example, in the case of iron and ferrimagnetic iron oxides, the crystal lattices are cubic and the preferred directions of magnetization are along three crystal axes (often referred to as "cubic crystalline anisotropy").

The acicular magnetic particles employed in this invention have both magnetocrystalline anisotropy and shape anisotropy. This shape anisotropy is attributable to the acicularity of the particles and provides the particles with a preferred axis of magnetization. Shape anisotropy achieved through acicularity can also be referred to as "uniaxial shape anisotropy." With such acicular magnetic particles, the shape anisotropy is dominant and the individual particles will have a single easy axis of magnetization but, a distribution containing such particles can have spherically symmetrical intrinsic magnetic properties, provided the orientation of the individual particles is random such that their individual shape anisotropies are statistically uniform for each direction. Stated another way, the magnetic anisotropies of the individual particles in a distribution "cancel out" for each direction to provide magnetic isotropy.

Figure 2A:
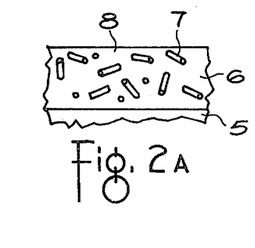
FIGS. 2A and 2B are partial cross-sectional views of magnetic recording elements within the scope of this invention depicting magnetic particle distributions having spherically symmetrical intrinsic magnetic properties.

FIG. 2A illustrates a preferred embodiment of this invention in which a support 5 is coated with a magnetic recording layer 6 containing magnetic particles 7 dispersed in a binder 8. In this illustration, the magnetic particles have both shape and magnetocrystalline anisotropies. Typical particles of this type are doped ferrimagnetic iron oxide particles of low acicularity, e.g., acicularity ratios up to about 8, generally about 2–8. The shape anisotropies due to the low acicularity ratios of the individual particles provide a very slight directive effect which "unbalances" the magnetocrystalline anisotropy (preferred directions of magnetization along three crystal axes) attributable to doping, and bestows upon such particles a single preferred direction of magnetization (along one axis). Particles having such low acicularity ratios (2–8) exhibit improved thermal stability and yet easily provide a random orientation. The distribution of particles, randomly magnetically oriented in the magnetic recording layer, has the required spherically symmetrical intrinsic magnetic properties.

Figure 2B:
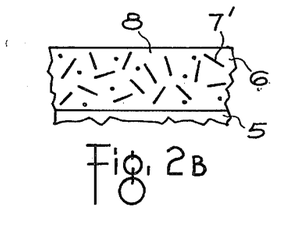

FIG. 2B illustrates another embodiment of this invention, in which the acicular magnetic particles 7' forming the distribution, have very high acicularity, in comparison to the particles 7 of FIG. 2A. This high acicularity e.g. 30 or more, provides shape anisotropy which completely dominates magnetocrystalline anisotropy. Typical magnetic particles of this type are acicular metal particles and undoped magnetic iron oxides. In this case, the individual magnetic particles are also oriented such that the distribution has no statistically preferred easy axis of magnetization, which results in an isotropic magnetic recording layer of this invention.

It is significant to note that acicular particles having a relatively low acicularity, for example, an acicularity of 2–8, as depicted in FIG. 2A, provide isotropic magnetic recording layers that exhibit good thermal stability. As previously indicated, the prior art clearly suggests that the acicularity of magnetic particles should be maximized in order to more readily provide the anisotropic magnetic recording layers considered so desirable prior to this invention. Thus, the superior thermal stability (evidenced by lack of fading of recorded signal) achieved using the aforementioned acicular magnetic particles is clearly unexpected in view of such prior art suggestions. Also, although magnetic particles having higher acicularities (as depicted in FIG. 2B) can be employed in this invention, we have determined that the stabilizing influence contributed by acicularity reaches a maximum at an acicularity of about 15 and does not significantly increase (or decrease) with an increase in acicularity.

The distribution of magnetic particles used in this invention can be prepared from a wide variety of ferro- or ferri-magnetic particles. Typical magnetic particles are, for example, particles of ferro- and ferri-magnetic iron oxide, both the black oxide of ferrous ferric oxide as well as the brown gamma ferric oxide, complex oxides of iron and cobalt, chromium dioxide, various ferrites, and the like. Acicular magnetic iron oxide particles which contain doping metal ions are preferred materials. The acicular magnetic particles employed in this invention generally have an average acicularity up to 15 or more, preferably in the range of about 2 to 8. Elongated particles which are not actually "needle-like", e.g., those having an acicularity of less than 2 can also be used. It should be understood that such particles are included within the term "acicular," as used herein.

The magnetic particles can be doped with one or more ions of a polyvalent metal such as cobalt, ferrous iron, nickel, chromium, zinc, cadmium, manganese, calcium, tin, samarium or europium. The concentration of doping ion employed is subject to variation, depending upon such things as size of the magnetic particles, their method of preparation and the specific coercivity desired. Dopant levels in the range of about 1 to about 10 atomic percent, often about 1 to about 7 atomic percent, particularly with cobalt ion, are generally suitable. However, some dopant ions, e.g., ferrous ions, can be used at concentrations up to about 30, often 12–20 atomic percent. The magnetic particles can be magnetic iron oxides that have alkali metal ions internal to the crystal lattices of the particles. Examples of procedures for preparing such particles can be found in United Kingdom Pat. No. 1,395,704 (complete specification published May 29, 1975) and Hector et al. U.S. Pat. No. 4,178,416, issued Dec. 11, 1979. Suitable particles often contain up to 10 atomic percent, generally about 0.2 to about 6 atomic percent of ions of such alkali metals as sodium or potassium. These ions are generally present in combination with the polyvalent metal doping ions previously described. Particle sizes of the acicular, ferro- or ferri-magnetic particles are generally quite small, with their major axes having an average length up to about 1.5 microns, often about 0.3 to 1 micron and preferably less than about 0.3 micron.

The coercivities ($H_c$) of the magnetic particles employed in practicing this invention are subject to variation, but such coercivities are at least 450 Oe, preferably at least 650 Oe, often in the range of about 650 to 800 Oe and sometimes up to 1,200 Oe or more. Coercivities of at least 450 Oe are necessary to provide high level performance for recording and reproducing signals of short wavelength. For example, particles having a coercivity of at least 450 Oe form a recorded image which is relatively stable, since such particles are resistant to the demagnetizing interaction fields that are so significant at short wavelengths. Furthermore, the increased stability of recorded information makes it possible to achieve higher output at short wavelengths upon playback.

The distribution of magnetic particles employed to provide an isotropic magnetic recording layer of this invention can be prepared in several ways, depending upon the specific nature of the individual particles that form the distribution. The method employed is one in which the magnetic response of individual magnetic particles is directed within an array of a large number of such particles, so that the magnetic response of the array is made substantially equal in all directions to thereby provide a distribution of magnetic particles in which there is no preferred easy axis of magnetization. In other words, the magnetic response provided by the distribution (as opposed to the individual particles) is substantially equal in all directions.

The selection of appropriate dispersion and coating techniques to accomplish the required distribution of particles within the magnetic recording layer will be apparent to those skilled in the art in light of the teachings of this specification, and particularly the following Examples. The required distribution is formed using acicular magnetic particles that are magnetically anisotropic. They have magnetocrystalline anisotropy and a single easy axis of magnetization attributable to shape anisotropy. Such particles are homogeneously dispersed in a binder to provide a random magnetic orientation such that magnetic anisotropies contributed by individual particles are balanced in all directions (made substantially equal) and the resulting distribution of particles has no statistically preferred easy axis of magnetization. The dispersion is then formed into a magnetic recording layer while maintaining the particle distribution previously established. The coating method used is one which does not allow orientation of the particles due either to flow or to the influence of directive magnetic fields. An example of such a method is off-set gravure coating. Another way to maintain the distribution is to use a binder in the dispersion that can be quickly solidified, e.g., a U.V. or electron beam curable composition, which quickly stabilizes the distribution within the magnetic recording layer. Again, the individual particles form a distribution in which their composite action provides spherically symmetrical magnetic properties, resulting in a magnetically isotropic layer.

Figure 3:
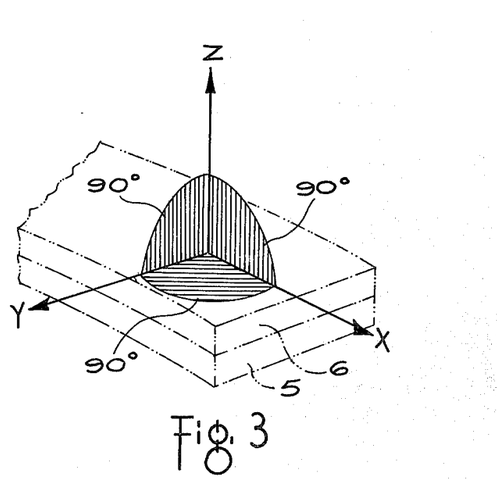
FIG. 3 is a schematic illustration of a short length of magnetic tape of this invention depicting magnetic isotropy in three orthogonal directions (along X, Y and Z axes).

The isotropic magnetic response exhibited by a recording layer of this invention is illustrated in FIG. 3, which depicts a short length of magnetic tape and the axes of the three-dimensional coordinate system in which the tape lies. The orientation depicted sets forth an accepted standard in which X is in the plane of the recording layer 6 corresponding to the length of the tape and the direction of travel during longitudinal recording and reproducing, Y is normal to the X direction and in the plane of the magnetic recording layer, and Z is perpendicular to such plane. Since the magnetic response of the magnetic recording layer is isotropic, the coercivities measured in the X, Y and Z directions are substantially equal. This relationship also exists among intensities of remanent magentization measured in such directions. These equalities are depicted by solid arrows of substantially equal length along the X, Y and Z axes in FIG. 3. By substantially equal, we mean that the layer coercivities and remanent intensities of magnetization, respectively, measured in each of the orthogonal directions (along X, Y and Z axes), do not differ from one another by more than ±5 percent, and preferably not more than ±2 percent. From an examination of FIG. 3, it will be apparent that a magnetic recording layer of this invention exhibits substantial "vertical" magnetization (magnetization along the Z axis) which is in contrast to conventional prior art anisotropic magnetic layers which are not specifically designed for "vertical" recording and ordinarily exhibit significant magnetization only within the plane of the magnetic layer. It should, of course, be understood that the directions along the X, Y and Z axes were selected in FIG. 3 for purposes of illustration only, and that the relationship among coercivities and among intensities of remanent magnetization described herein exist in any three orthogonal directions in a magnetic recording layer within the scope of this invention.

A suitable test method for making the coercivity and intensity of remanent magnetization measurements discussed in the preceding paragraph is set forth below. It will be appreciated that this test method can establish the presence in a magnetic recording layer of the distribution of magnetic particles described herein. Magnetic recording elements which show the presence of such a distribution by this test method are within the scope of this invention.

Test Method

Square samples of magnetic layer to be examined are cut from a magnetic recording element. These samples are formed into a compact stack of suitable dimension for insertion into a hysteresis-loop measuring instrument. Typical dimensions for the individual squares are 3 mm on a side and a typical stack contains 32 of these squares. This configuration will generally provide adequate response and precision for most hysteresis-loop measuring instruments.

The individual squares are placed in the stack with the magnetic layers all facing in the same direction and all squares are oriented in the same direction (e.g., X, Y and Z directions) as they were in the magnetic element. Accordingly, the stack comprises alternating magnetic recording layers and their supports. The directions in the stack that are selected for measurement are identified and their identity is maintained throughout the test. Convenient directions are X, Y and Z directions, and this test will be further described with reference to these directions.

The saturation hysteresis-loop is determined by making the required measurements (coercivity in Oersteds, saturation magnetization and intensity of remanent magnetization in Gauss) with the stack initially positioned so that the applied field is in the X direction of the stack. The stack is then repositioned and the saturation hysteresis-loop is determined with the applied field in the Y direction of the stack. The stack is again repositioned and the saturation hysteresis-loop is determined with the applied field in the Z direction of the stack.

Conventional procedures are used for making measurements in the X, Y and Z directions. However, for measurements in the Z direction, a demagnetizing field occurs which must be taken into consideration in determining the effective field to which the stack is subjected in its Z direction. Such demagnetizing field results from the fact that the Z direction dimension of each layer of the magnetic recording material within the stack (thickness of the magnetic recording layer) is so small in comparison to the dimensions of the continuous magnetic media extending in the other directions. A typical method of calculating this demagnetizing field and several typical correction factors are described by W. F. Brown, Jr. in "Magnetostatic Principles in Ferromagnetism," Interscience Publishers, Inc., New York, 1962 at pages 187–192 (Appendix). In the instant case, this demagnetizing field is substantially equal to the magnetic moment per volume unit of the stack. Accordingly, the effective field to which the stack is subjected during measurements in its Z direction is equal to the applied field minus the magnetic moment of the stack. This must be taken into consideration to insure that the effective field to which the stack is subjected in all directions is sufficiently intense, so that all measurements are made on saturation loops for the stack. It is apparent that this is necessary in order to provide values in each of the direction (X, Y and Z directions) that are comparable. If orthogonal directions other than X, Y and Z directions are chosen for the measurements described herein, it is, of course, necessary to give consideration to any demagnetizing fields that may be present by using the appropriate correction factors for such fields.

The values for coercivity, saturation magnetization, and remanent magnetization ratios ($I_{rx}/I_{rz}$ and $I_{rx}/I_{ry}$) reported in the following Examples were determined using measurements made according to this test method. The remanent magnetization ratios represent the proportions between the values of the intensity of remanent magnetization (sometimes simply called remanence or retentivity), measured in the directions identified in the subscripts, e.g., $I_{rx}$ being intensity of remanent magentization in the X direction. The saturation applied field used in making the measurements in the following Examples using this test method was 4,500 Gauss.

Figure 4:
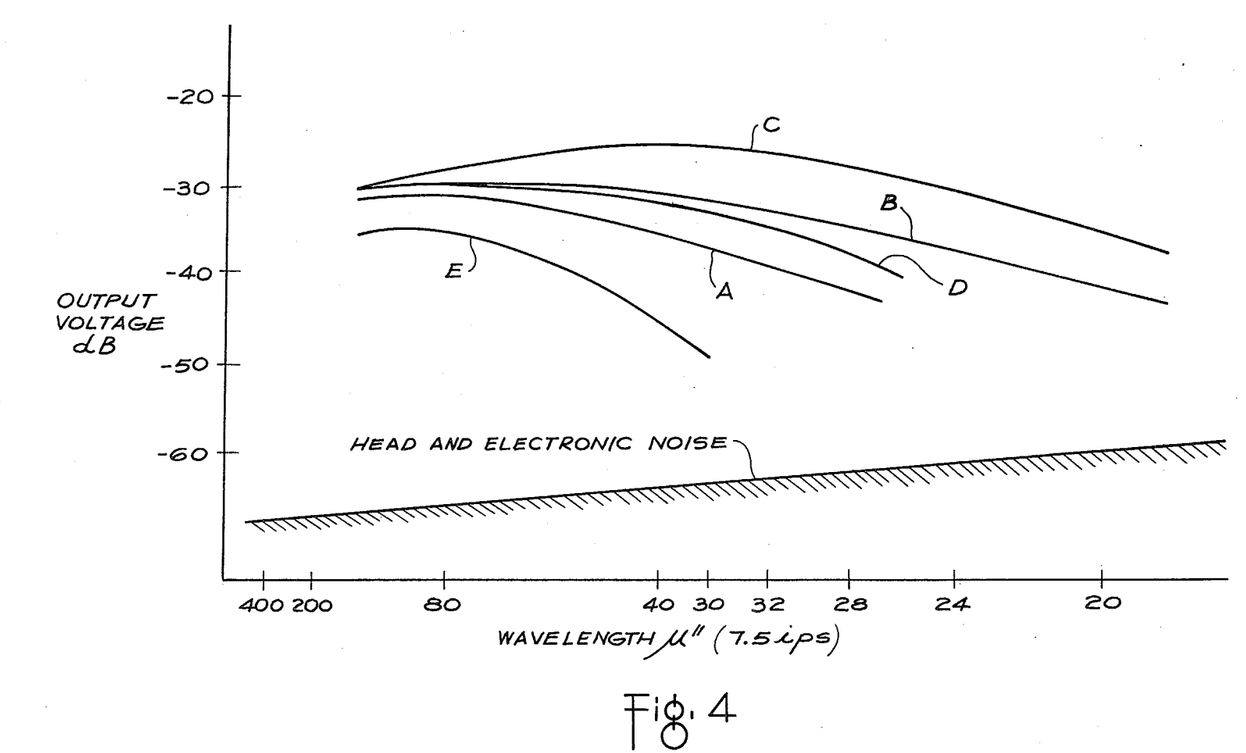
FIG. 4 depicts a series of curves illustrating the advantages obtained with magnetic elements of this invention, when magnetic signals of short wavelength are recorded using a short gap record head.

The magnetic recording elements of this invention exhibit superior magnetic recording performance at short recorded wavelengths, in comparison to comparable commercially available prior art tapes or related recording elements provided for comparison purposes. This is illustrated by FIG. 4 which sets forth Curves A-E indicating the playback performance measured with a small gap recording head (0.2 micron magnetic record gap) as disclosed in *Research Disclosure*, Volume 187, November, 1979, Item 18752, pages 665–666, published by Industrial Opportunities, Ltd., Homewell, Havant Hampshire PO9 1EF United Kingdom, with the magnetic tape samples set forth in the following Table 1.

The magnetic record gap length of 0.2 micron was employed to record a band of frequencies from DC to greater than 500 kHz at a tape to head velocity of 7.5 inches per second, playback being obtained by using a playback magnetic gap of the same length. The details of the procedure were as follows:

Introduce into the record head a signal current having a frequency of 300 kHz and a relatively low level amplitude (at least 10 dB below saturation level) in conjunction with a bias current. While monitoring the reproduced output level of the 300 kHz signal current, increase the bias current until the maximum signal output is observed. Increase the bias current further until the 300 kHz signal output is reduced 2 dB below the maximum signal level to establish an "operating bias" level.

Using this "operating bias" level, introduce a signal current having a frequency of 30 kHz. While monitoring the 30 kHz output level and a 90 kHz output level (third harmonic distortion component of the recording), increase the signal current until the output contains 1% of the third harmonic component. This establishes a "record level."

Introduce signal currents at suitable frequencies to define response over the bandwidth of interest, maintaining the bias at the "operating bias" and the signal current at the "record level" (independent of frequency). The resulting data (reported in Curves A-E in FIG. 4) defines the response of the recording system.

Table 1

Curve A:
 Ampex 797 instrumentation tape, product of Ampex Corporation, Redwood City, Calif.
Curve B:
 Tape prepared according to Example 1 of Legras et al U.S. Pat. No. 4,163,823, issued Aug. 7, 1979.
Curve C:
 Tape of this invention, prepared according to Example 1 (Recording Element 1).
Curve D:
 3M-5147 tape, product of Minnesota Mining and Manufacturing Co., St. Paul, Minn.
Curve E:
 Tape in which magnetic recording layer contained gamma ferric oxide particles with non-uniaxial (cubic) anisotropy and a coercivity of about 290 Oersteds.

The magnetic recording layers of the tapes used to provide Curves A and B are anisotropic and have preferred magnetization axes along the direction of relative motion between the tape and the head. The magnetic recording layer in the tape used to provide Curve D is anisotropic and shows a variation of magnetic properties as a function of direction within the plane of the recording layer. The magnetic recording layer in the tape used to provide Curve E is isotropic, and supports magnetization in three orthogonal directions but has a coercivity of only 290 Oe, in comparison to a coercivity of at least 450 Oe, as required in the practice of this invention.

Upon inspection of Curves A-E in FIG. 4, it can be seen that the magnetic recording element of this invention exhibits superior playback signal-to-noise ratios for recorded signals at wavelengths as short as 0.4 to 0.6 micron, and also at longer wavelengths (which are still considered to be "short" wavelengths in the prior art).

The binders that can be used to homogeneously and uniformly disperse the magnetizable particles in the magnetic recording layers according to this invention include any of the binders well known for the manufacture of such layers. These binders are normally present in a liquid, rather viscous medium. Typical binders are polymeric materials such as non-crosslinked polymers and crosslinked polymeric binders containing hydrophilic groups. Examples of polymeric binders are copolymers of vinyl acetate with vinyl chloride, copolymers of vinylidene chloride with acrylonitrile, copolymers of acrylic and/or methacrylic esters, polyvinylbutyral, copolymers of butadiene with styrene, terpolymers of acrylonitrile, vinylidene chloride and maleic anhydride, cross-linked or non-cross-linked, homopolymers or copolymers such as polyamide, polyurethanes, polyesters and the like, as well as mixtures of these binders. Good results can be obtained with a copolymer of vinyl chloride with vinyl acetate, partially hydrolyzed, and possibly cross-linked by an isocyanate or similarly reactive constituent, or by using polyurethanes or a mixture of these binders. The amount of binder employed with respect to the magnetizable material in a magnetic recording layer in an element of this invention is generally in the range of about 10 percent to about 40 percent, by weight, of magnetizable material and preferably from about 15 percent to about 25 percent, by weight.

The magnetic recording layer described herein can be applied to a wide variety of non-magnetizable supports, including discs, belts, paper or film, and the like. Suitable supports can bear subbing or other layers, are generally flexible and typically include such materials as cellulose nitrate film, cellulose acetate film, polyvinyl acetal film, polystyrene film, polyester such as polyethylene terephthalate film, which can be biaxially or symmetrically stretched, polycarbonate film, and related films or resinous materials, as well as papers, metals such as aluminum or brass, and the like.

Suitable solvents that can be employed in the binder composition used to prepare a magnetic recording layer or layers used in the practice of this invention include organic materials such as methyl ethyl ketone, methyl isobutyl ketone, ethyl acetate, butyl acetate, cyclohexanone, butyl alcohol, methylene chloride, tetrahydrofuran, dioxane, dimethylformamide and the like as well as mixtures thereof. The magnetic recording layers used in the elements described herein can contain other additives such as lubricants and the like as would be obvious to those skilled in the art. As would be apparent to those skilled in the art, the magnetic recording elements of this invention can contain layers in addition to magnetic recording layers which contain magentizable particles. Typical layers of this type are antistatic layers, which are conventional in the art.

It is known that the smoothness of the surface of a magnetic recording element is very important in obtaining good signal reproduction, particularly at short wavelengths, because the magnetic flux decreases greatly as the distance separating the recording head and/or the reproducing head and the magnetic layer increases. Furthermore, variations in coupling between the recording or reproducing head the the magnetic recording layer increases the noise level. Also, a rough magnetic layer increases abrasion of the recording and reproducing heads. Accordingly, it is preferred that the magnetic recording layers described herein be as smooth as possible. Such smoothness can be accomplished using compacting procedures of the type described in the prior art as exemplified by Legras et al. U.S. Pat. No. 4,163,823, issued Aug. 7, 1979.

Compacting a magnetic recording layer of this invention, e.g., by calendering, according to the teachings of this patent imparts an extremely smooth surface to the medium. This smoothness can be expressed in terms of "percent contact area." This "percent contact area" is determined with relation to a reference surface consisting of the hypotenuse surface of a transparent optical prism in the shape of an isosceles right triangle. The value of an incident luminous flux directed for total reflection from the hypotenuse surface is equal to 0. The flux reflected by the hypotenuse surface is, therefore, equal to $\phi$ but is reduced and becomes equal to $\phi'$ when one places an absorber in optical contact with the hypotenuse surface. A sample of the magnetic element being measured, when contacted under controlled pressure against the surface (with the outermost magnetic recording layer of the element in contact with the surface) produces light absorption that increases as the smoothness of the magnetic recording layer increases. The "percent contact area" is equal to $[(0-0')/\phi] \times 100$. The value of the "percent contact area" increases with the flatness of the surface of the magnetic recording layer, i.e., with the surface smoothness of the layer. A magnetic recording element of this invention, when subjected to compacting as described herein, exhibits a surface smoothness, determined as "percent contact area" of at least about 86 percent and often up to 89 percent, 90 percent or more.

The invention is further illustrated by the following Examples of its practice which will be described in relation to products depicted in FIGS. 2A and 2B (although, of course, it may be practiced with other embodiments specifically indicated or those within the broader teachings of this specification).

The signal level upon reproduction of recordings (output) for magnetic recording elements prepared according to certain of the following Examples were measured using conventional procedures and the following specific test conditions:

| Measurement Procedure | | |
|---|---|---|
| 1. Measurement Conditions | | |
| Tape recorder | | Honeywell 7600 |
| Linear speed of the tape | in/sec | 7½ (19.05 cm/sec) |
| Recording gap | micron | 0.3 |
| Playback gap | micron | 0.3 |
| Track width | in | 0.010 (0.25 mm) |
| Signal frequency | kHz | 1–300 |
| 2. Signal Level (Output) | | |

With no bias current, introduce a signal current having a frequency of 300 kHz. Increase the signal current until the maximum signal output is observed. This establishes "saturation record level" which can be used as a reference recording level in comparing a series of recording layers.

A signal at the "saturation recording level" is recorded in a magnetic recording layer by means of the recording head. The output levels reported in the following Tables are measured in dB at the terminals of the reproducing head using an arbitray reference value as relative zero.

Example 1

As previously indicated, acicular magnetic particles having both shape and magnetrocrystalline anisotropies, as depicted in FIG. 2A are preferred in the practice of this invention. To illustrate, cobalt doped gamma ferric oxide particles having such anisotropies are obtained according to Example 3 of United Kingdom Pat. No. 1,395,704 (complete specification published May 29, 1975) except that 9.5 liters of water is added rather than 2.5 liters, at the completion of the ferrous hydroxide precipitation and prior to oxidation.

All of the cobalt doped gamma ferric oxide particles contained about 0.2 atomic percent of sodium ions, and about 4 atomic percent cobalt ions in their crystal lattices. They also had an average length of 0.2–0.3 micron and an average acicularity of 3–4. These particles were used in magnetic recording elements of this invention which were prepared according to the following procedure:

A magnetic dispersion was made up by milling together the following ingredients in a 1 liter ball mill:

| | Parts By Weight |
|---|---|
| Cobalt doped gamma ferric oxide | 150 |
| Copolymer of vinyl chloride with vinyl acetate, partially hydrolyzed[1] | 15 |
| Methyl isobutyl ketone | 260 |

After 120 hours of milling, the following ingredients were added and milling was continued for 48 hours:

| | Parts by Weight |
|---|---|
| Copolymer of vinyl chloride with vinyl acetate, partially hydrolyzed[1] | 15 |
| Octyl epoxy stearate[2] | 3 |
| Methyl isobutyl ketone | 80 |

Notes:
[1]Suitable products are sold under the trade name VAGH by Union Carbide Corporation, and under the trade name Vinnol by Wacker Chemie.
[2]Suitable Products are sold under the trade name Edenol by Henckel, and under the name Ecepox by Ugine-Kuhlmann.

Three magnetic dispersions were prepared using the above procedure. These dispersions were used in recording elements identified as 1–3 in the following Table 2. A fourth dispersion was prepared using the above procedure except that the VAGH copolymer was crosslinked by blending with an aliphatic polydiisocyanate (commercially available as Desmodur-N from Mobay Chemical Corporation) and a dibutyl tin laurate cross-linking catalyst. Approximately 50 percent of the available hydroxyl groups in the VAGH copolymer were crosslinked. This fourth dispersion was used in magnetic recording element number 4 in Table 2.

Four parts by weight, of oleylamide oleate (commercially available from Perreffite-Auby as Inipol) was added to the resulting dispersion and the dispersion was coated using an extrusion hopper onto a poly(ethylene terephthalante) support (20 micron thick) subbed with copoly(vinylidene chloride acrylonitrile) polymer.

While the binder was still in a thermoplastic condition, the dried layer was calendered between steel/cotton rolls with the magnetic recording layer against the steel roll. The steel roll was maintained at a temperature of 85° C., the force between the rolls was about 250 kg./cm, and the final thickness of the magnetic recording layer was about 6-7 microns.

The magnetic properties and surface smoothnesses of the resulting magnetic recording elements were determined using procedures and specific test conditions described previously herein. The results are set forth in the following Table 2. For comparison purposes, Table 2 also includes the corresponding magnetic properties and surface smoothnesses of the comparable commercially available prior art tapes and related elements set forth in Table 1 of this specification.

lar gamma ferric oxide particles (1.5 atomic percent cobalt, average particle size of 0.8 micron, and an average acicularity of 30) in 35 parts, by weight, of a liquid binder composition comprising 8 parts, by weight, of a copolymer of vinylidene chloride (85 wgt. %) with vinyl acetate (15 wgt. %),[1] 27 parts, by weight, of copolymer of vinyl chloride with vinyl acetate, partially hydrolyzed[2] and 5 parts, by weight, of oleic acid, and 367 parts, by weight of a solvent mixture comprising 318 parts, by weight, of methylene chloride and 49 parts, by weight, of butanol. The resulting dispersion is coated in a layer having a wet thickness of about 10 microns onto a poly(ethylene terephthalate) support (20 microns thick), subbed with copoly(vinylidene chloride acrylonitrile) polymer. The layer is coated by the off-set gravure coating method, which essentially eliminates orientation of particles due to flow with these highly acicular particles and maintains the randomization present in the dispersion. The gravure coating roll is a 20 line/centimeter triangular helix roll with 175 micron cell depth. The resulting layer is dried at 90° C. The binder sets up almost immediately upon evaporation of solvent, which maintains the random orientation of magnetizable particles in the solidified layer.

TABLE 2

| Recording Element | Surface Smoothness Percent Contact Area) | Measurements Along Each of X, Y and Z Axes (+5%) | | | | Output 0.6 Micron Wavelength Saturation No Bias (dB) |
|---|---|---|---|---|---|---|
| | | Coercivity (Oersteds) | Saturation Magnetization (Gauss) | Intensity of Remanent Magnetization (Gauss) | Ratio of Intensity of Remanent Magnetization $I_{rx}/I_{rz}$   $I_{rx}/I_{ry}$ | |
| 1 | 91 | 858 | 1,700 | 1,550 | 1.02   1.00 | +8.0 |
| 2 | 92 | 868 | 1,680 | 1,500 | 1.00   1.00 | +8.0 |
| 3 | 91 | 773 | 1,650 | 1,430 | 1.02   1.01 | +6.0 |
| 4 | 90 | 857 | 1,680 | 1,530 | 1.02   1.00 | +7.0 |
| Ampex 797 instrumentation tape (Curve A) | 82 | 312 | 1,280 | 970 | 1.90   1.82 | −14.5 |
| Legras et al U.S. Pat. No. 4,163,823 Example 1, (Curve B) | 94 | 916 | 1,420 | 1,190 | 1.15   1.06 | +5.5 |
| 3M-5147 tape (Curve D) | 84 | 820 | 1,340 | 1,120 | 1.03   1.07 | −2.0 |
| Tape with non-uniaxial (cubic) anisotropy (Curve E) | 70 | 290 | 2,160 | 1,600 | 0.99   1.02 | nil |

Example 2

The magnetic recording elements of this invention can include a magnetic recording layer in which the magnetic particles 7' depicted in FIG. 2B have much greater shape anisotropy in comparison to the magnetic particles used in Example 1 and depicted in FIG. 1A. The following procedure is presented to illustrate this feature of the invention.

A magnetic dispersion is prepared as in Example 1, by dispersing 100 parts, by weight of cobalt doped, acicu- Notes: (1) Available commercially as Rhodapas AX 85-15 from Rhone Poulenc Co., Paris, France. (2) Available commercially as Rhodapas AXRM from Rhone Poulenc Co., Paris, France.

The magnetic properties and surface smoothness of the resulting magnetic recording elements, determined as in Example 1 are as follows:

TABLE 3

| Surface Smoothness (Percent Contact Area) | Measurements Along Each of X, Y and Z Axes (+5%) | | | | Output 0.6 Micron Wavelength Saturation No Bias (dB) |
|---|---|---|---|---|---|
| | Coercivity (Oersteds) | Saturation Magnetization (Gauss) | Intensity of Remanent Magnetization (Gauss) | Ratio of Intensity of Remanent Magnetization $I_{rx}/I_{rz}$   $I_{rx}/I_{ry}$ | |
| 88 | 600 | 1,600 | 1,250 | 1.02   1.00 | +6-8 |

Example 3

A radiation-curable coating composition is prepared from the following ingredients by ball-milling as in Example 1.

|  | Parts By Weight |
|---|---|
| Gamma Fe$_2$O$_3$ (average partricle size 0.8 microns, average acicularity 30) | 100 |
| Bis-phenol-A/fumaric acid polyester | 10 |
| Butyl acrylate | 17 |
| Benzoin | 3 |

The radiation-curable composition is coated as a magnetic recording layer with a wet thickness of 8 microns onto poly(ethylene terephthalate) support by the off-set gravure coating method, as in Example 2. The magnetic recording layer is cured by passing it at a speed of 50 ft/min. through a curing chamber containing a 300 K volt electron beam source with the coated layer facing such source. The layer receives about 1 megarad per gram of the resin binder. The total time in the curing chamber is 3 milliseconds. Both the polyester and butyl acrylate are radiation-curable materials and are quickly cured by the electron beam source into a cross-linked polymeric matrix surrounding the gamma ferric oxide particles. As a result, such particles maintain the random orientation established during ball-milling and gravure coating. The magnetic properties and surface smoothness of the magnetic recording element, determined as in Example 1, are substantially the same as those reported in Table 3 for the magnetic recording element of Example 2.

The invention has been described in detail with particular reference to preferred embodiments thereof, but it will be understood that variations and modifications can be effected within the spirit and scope of the invention.

We claim:

1. A magnetic recording element comprising a layer containing acicular magnetic particles dispersed in a binder,
    said particles having magnetocrystalline anistropy, shape anisotropy which provides a preferred axis of magnetization, and coercivities of at least 450 Oersteds,
    said particles being in the form of a distribution imparting to said layer magnetic isotropy as to coercivity and intensity of remanent magnetization.

2. A magnetic recording element according to claim 1 in which said particles have an average acicularity up to 15.

3. A magnetic recording element according to claim 1 in which said particles have an average acicularity of about 2 to 15.

4. A magnetic recording element according to claim 2 in which said particles have an average length of less than 0.3 micron.

5. A magnetic recording element according to claim 1 in which said particles are doped acicular gamma ferric oxide particles having a coercivity of at least 650 Oersteds, an average length of less than 0.3 micron and an average acicularity of about 2 to 8.

6. A magnetic recording element according to claim 1 wherein the values for coercivities measured in any three orthogonal directions are within ±5 percent and the values for intensity of remanent magnetization measured in any three orthogonal directions are within ±5 percent.

7. A magnetic recording element comprising a layer containing acicular magnetic particles dispersed in a binder,
    said particles having magnetocrystalline anisotropy, shape anisotropy which provides a preferred axis of magnetization, and coercivities of at least 450 Oersteds,
    said particles being in the form of a distribution having spherically symmetrical intrinsic magnetic properties, whereby said layer (a) has coercivities that are substantially the same in three orthogonal directions and (b) is capable of supporting intensities of remanent magnetization that are also substantially the same in three orthogonal directions.

8. A magnetic recording element according to claim 7 in which said particles have an average acicularity up to 15.

9. A magnetic recording element according to claim 8 in which said particles have a coercivity of at least 650 Oersteds.

10. A magnetic recording element according to claim 7 in which said particles are doped acicular gamma ferric oxide particles.

11. A magnetic recording element according to claim 10 in which said particles have an average length of less than 0.3 micron and an average acicularity of about 2 to 8.

12. A magnetic recording element according to claim 10 in which said particles have a coercivity of at least 650 Oersteds and an average length of less than 0.3 micron.

13. A magnetic recording element according to claim 7 in which said binder is a crosslinked polymeric binder containing hydrophilic groups.

14. A magnetic recording element according to claim 13 in which said layer has a surface smoothness, determined as percent contact area, of at least 89%.

* * * * *